(12) United States Patent
Sakhnini et al.

(10) Patent No.: US 12,237,963 B2
(45) Date of Patent: Feb. 25, 2025

(54) SYNCHRONIZATION SIGNAL BLOCK PATTERNS FOR HIGHER SUBCARRIER SPACING

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/956,224

(22) Filed: Sep. 29, 2022

(65) Prior Publication Data

US 2023/0106224 A1 Apr. 6, 2023

Related U.S. Application Data

(60) Provisional application No. 63/251,541, filed on Oct. 1, 2021.

(51) Int. Cl.
*H04L 27/26* (2006.01)
*H04L 5/00* (2006.01)
*H04W 72/0446* (2023.01)

(52) U.S. Cl.
CPC ........ *H04L 27/2666* (2013.01); *H04L 5/0048* (2013.01); *H04W 72/0446* (2013.01)

(58) Field of Classification Search
CPC .................................................... H04L 27/2666
USPC ......................................................... 375/262
See application file for complete search history.

(56) References Cited

U.S. PATENT DOCUMENTS

2020/0344103 A1* 10/2020 Jung ..................... H04J 11/0073
2020/0404601 A1* 12/2020 Lin ........................ H04L 1/0061

* cited by examiner

*Primary Examiner* — Lihong Yu
(74) *Attorney, Agent, or Firm* — Patterson + Sheridan, L.L.P.

(57) ABSTRACT

Certain aspects of the present disclosure provide techniques for wireless communication for a network entity, comprising transmitting signaling indicating a synchronization signal block (SSB) pattern that identifies SSB slots for sweeping a set of SSB beams over one or more SSB bursts with configurable gaps between at least some of the SSB slots, and transmitting SSBs in accordance with the pattern.

30 Claims, 13 Drawing Sheets

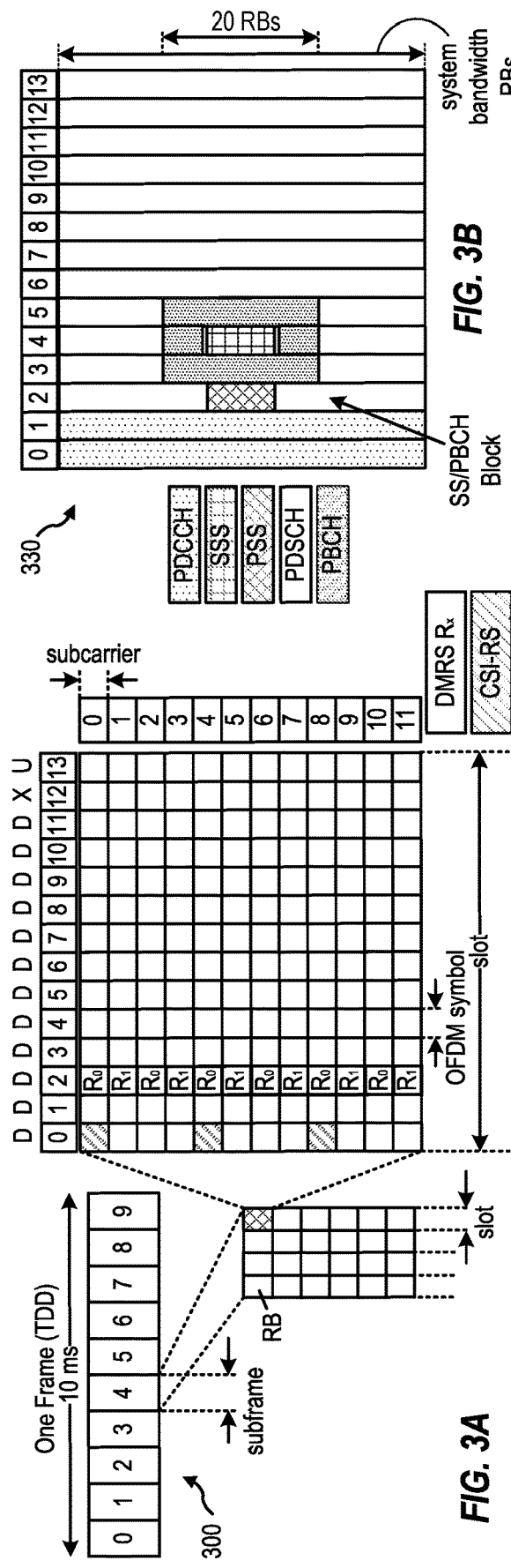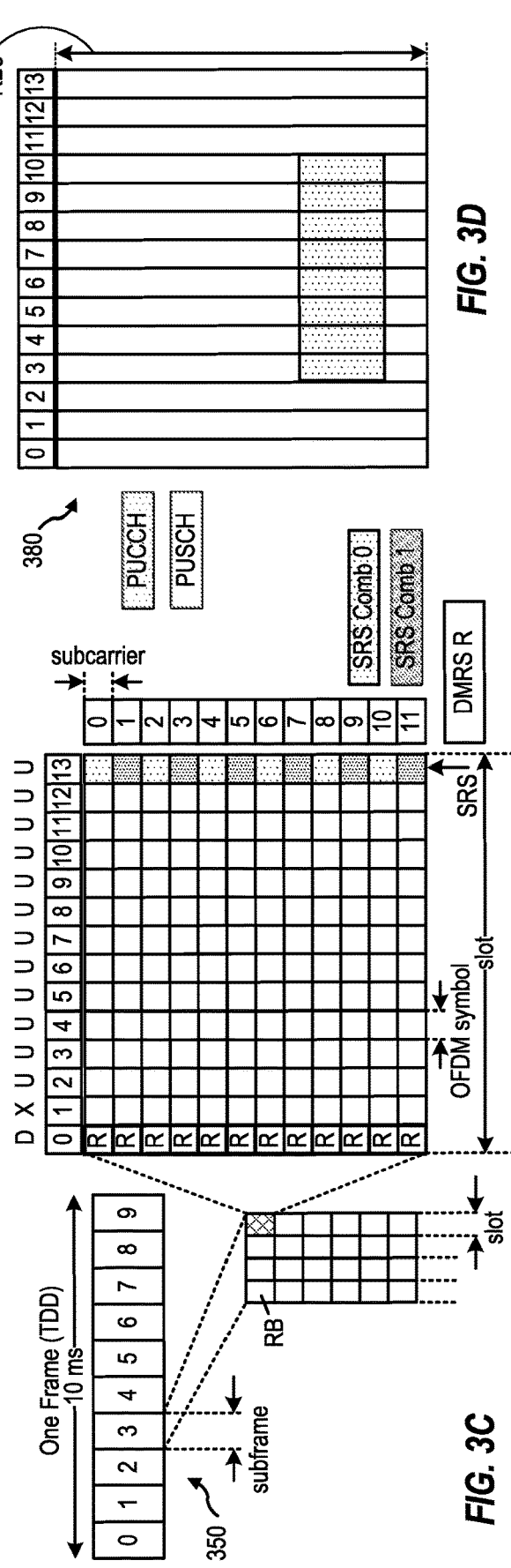

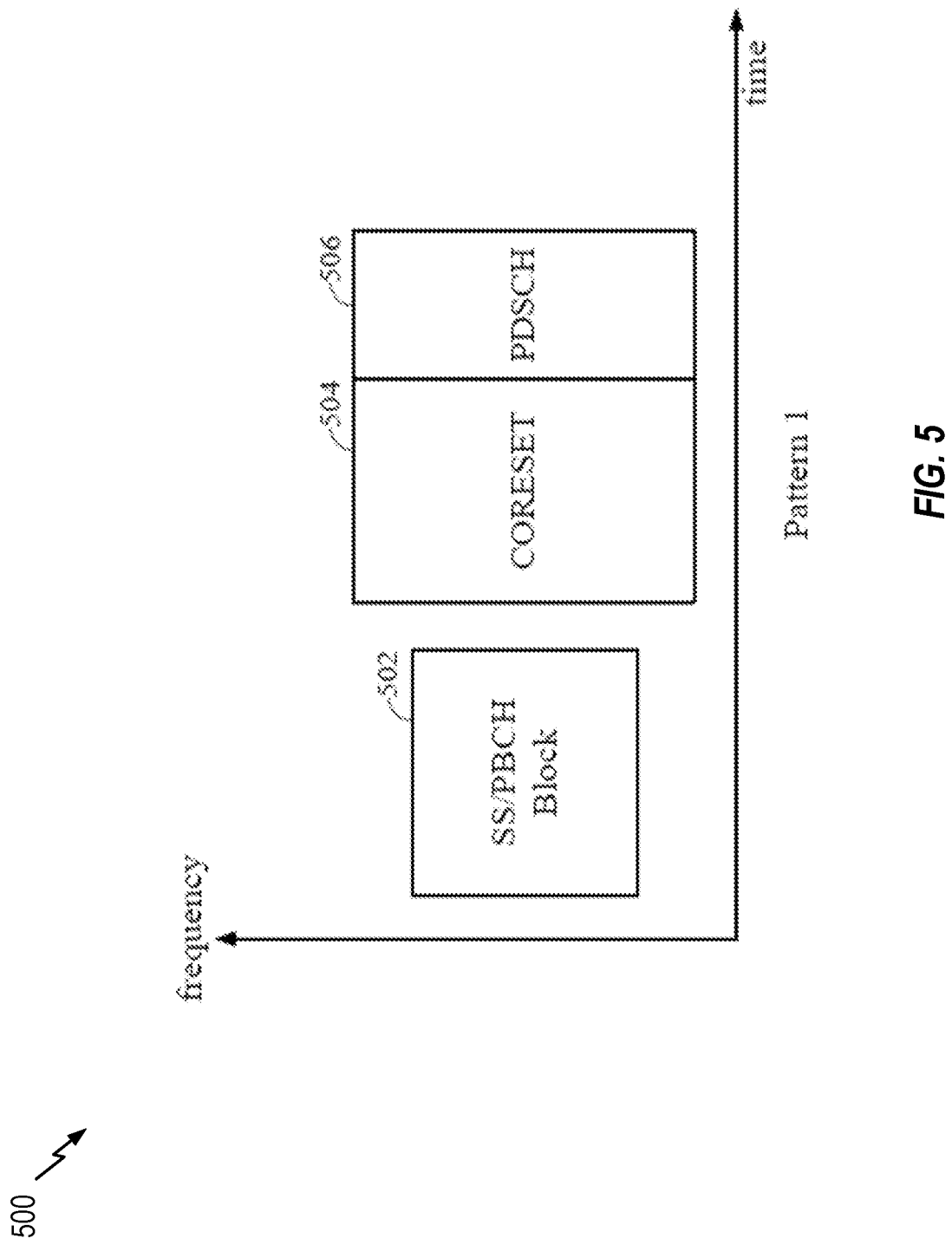

1000
A METHOD FOR WIRELESS COMMUNICATION FOR A NETWORK ENTITY
1010
TRANSMIT SIGNALING INDICATING A SYNCHRONIZATION SIGNAL BLOCK (SSB) PATTERN THAT IDENTIFIES SSB SLOTS FOR SWEEPING A SET OF SSB BEAMS OVER ONE OR MORE SSB BURSTS WITH CONFIGURABLE GAPS BETWEEN AT LEAST SOME OF THE SSB SLOTS
1020
TRANSMIT SSBS IN ACCORDANCE WITH THE PATTERN
FIG. 10

```
                    ┌──────────────────────────────────────┐
                    │ A METHOD FOR WIRELESS COMMUNICATION   │
                    │           FOR A USER EQUIPMENT        │
                    └──────────────────────────────────────┘
                                      │
                                      ▼                         ┌─ 1110
┌────────────────────────────────────────────────────────────────────┐
│ RECEIVE SIGNALING INDICATING A SYNCHRONIZATION SIGNAL BLOCK        │
│ (SSB) PATTERN THAT IDENTIFIES SSB SLOTS FOR SWEEPING A SET OF      │
│ SSB BEAMS OVER ONE OR MORE SSB BURSTS WITH CONFIGURABLE            │
│ GAPS BETWEEN AT LEAST SOME OF THE SSB SLOTS                        │
└────────────────────────────────────────────────────────────────────┘
                                      │
                                      ▼                         ┌─ 1120
┌────────────────────────────────────────────────────────────────────┐
│       MONITOR FOR SSBS IN ACCORDANCE WITH THE PATTERN              │
└────────────────────────────────────────────────────────────────────┘
```

SYNCHRONIZATION SIGNAL BLOCK PATTERNS FOR HIGHER SUBCARRIER SPACING

CROSS-REFERENCE TO RELATED APPLICATIONS

This application claims benefit of and priority to U.S. Application No. 63/251,541, filed Oct. 1, 2021, which is assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for transmitting synchronization signal blocks (SSBs) for higher frequency subcarrier spacing (SCS).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication for a network entity, comprising transmitting signaling indicating a synchronization signal block (SSB) pattern that identifies SSB slots for sweeping a set of SSB beams over one or more SSB bursts with configurable gaps between at least some of the SSB slots, and transmitting SSBs in accordance with the pattern.

One aspect provides a method for wireless communication for a user equipment, comprising receiving signaling indicating an SSB pattern that identifies SSB slots for sweeping a set of SSB beams over one or more SSB bursts with configurable gaps between at least some of the SSB slots and monitoring for SSBs in accordance with the pattern.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 3A, FIG. 3B, FIG. 3C, and FIG. 3D depict various example aspects of data structures for a wireless communication network.

FIG. 5 illustrates an example resource mapping, according to aspects of the present disclosure.

FIG. 10 illustrates example operations for wireless communications by a network entity, in accordance with some aspects of the present disclosure.

FIG. 11 illustrates example operations for wireless communications by a user equipment (UE), in accordance with some aspects of the present disclosure.

DETAILED DESCRIPTION

Aspects of the present disclosure provide apparatuses, methods, processing systems, and computer-readable mediums for transmitting synchronization signal blocks (SSBs) higher frequency subcarrier spacing (SCS), such as 480 kHz and 960 kHz.

In wireless networks, communications occur using time and frequency resources, generally divided into subcarriers or tones in the frequency domain and symbols in the time domain. Subcarrier spacing is generally equal to the reciprocal of symbol time. Collectively, subcarrier spacing and symbol length are referred to as a numerology.

Downlink and uplink transmissions are organized into frames (e.g., with 10 ms duration, each consisting of a set of subframes (e.g., 10×1 ms subframes). Each subframe can be further divided into slots. Slots tend to have a same number of symbols. Slot lengths vary depending on the subcarrier spacing such that, generally, slot length gets shorter as subcarrier spacing gets wider (due to shorter symbols).

Reduced slot lengths resulting from wider subcarrier spacing can impact various procedures, such as beam sweeping. Beam sweeping generally refers to transmitting a signal in predefined directions at regular intervals. In an initial access procedure (e.g., when a mobile phone is first turned on), that UE searches for synchronization signal blocks (SSBs) transmitted in different directions (beam swept) in an attempt to synchronize with the network and obtain system information.

Typically, a UE is designed to support a relatively large number of SSB beams (e.g., up to 64). While a larger SCS (hence shorter symbols) can result in reduced beam sweeping time, downlink to uplink (DL/UL) switching delays, used to take advantage of uplink segments within an SSB burst, may present a challenge at the UE. Reduced slot durations may also impact random access channel (RACH) procedures, involving physical RACH preamble transmission in RACH occasions (ROs), determined based on SSB detection.

Aspects of the present disclosure may help address these issues. For example, certain aspects of the present disclosure introduce SSB patterns with gaps designed to accommodate higher SCS. As another example, certain aspects of the present disclosure introduce RO configurations designed to accommodate higher SCS.

Introduction to Wireless Communication Networks

Figure 1:
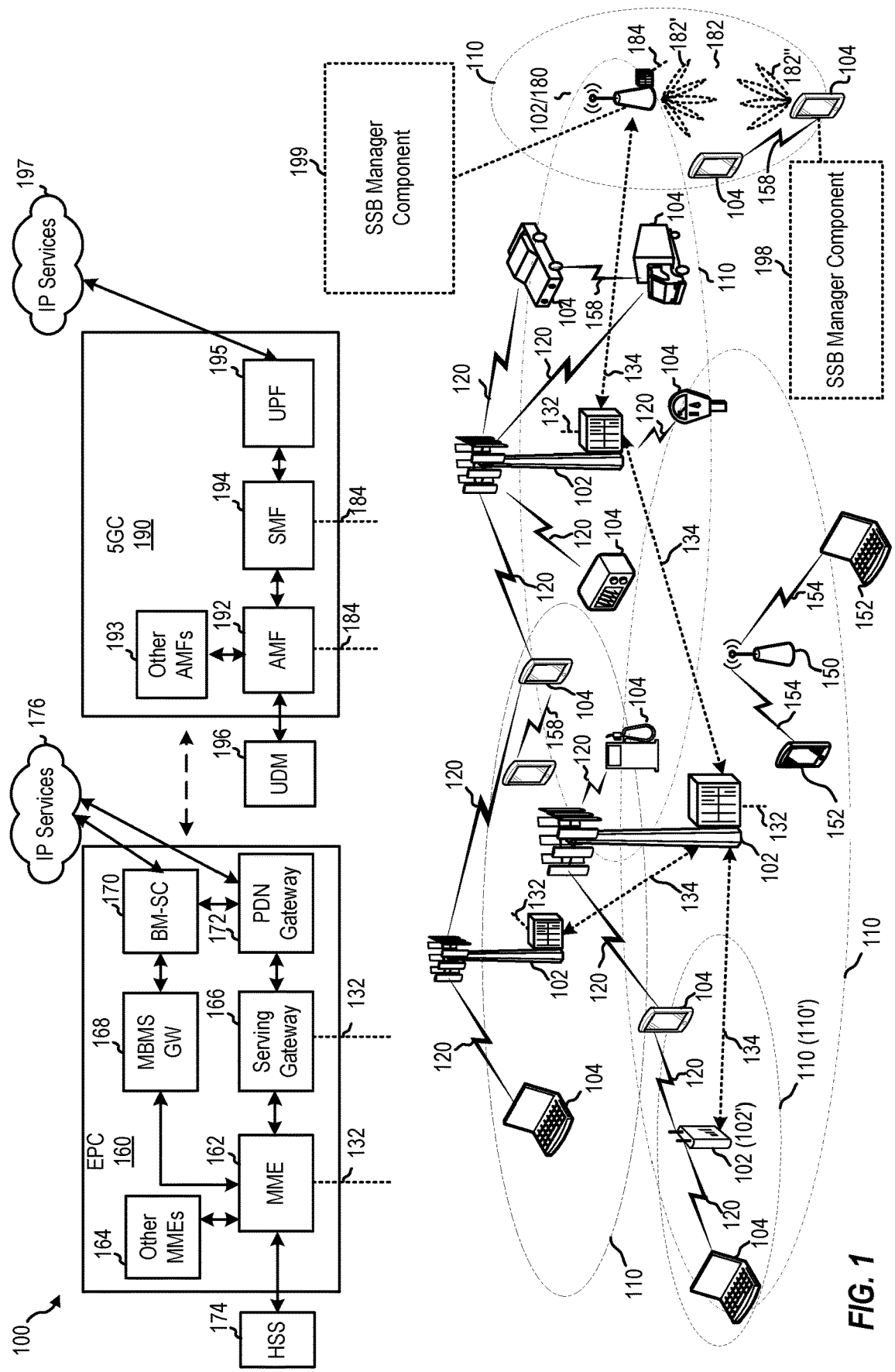
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes a signal synchronization block (SSB) manager component 199, which may be configured to transmit SSBs with patterns for subcarrier spacing (SCS). Wireless network 100 further includes an SSB manager component 198, which may be configured to receive SSBs with patterns for SCS.

Figure 2:
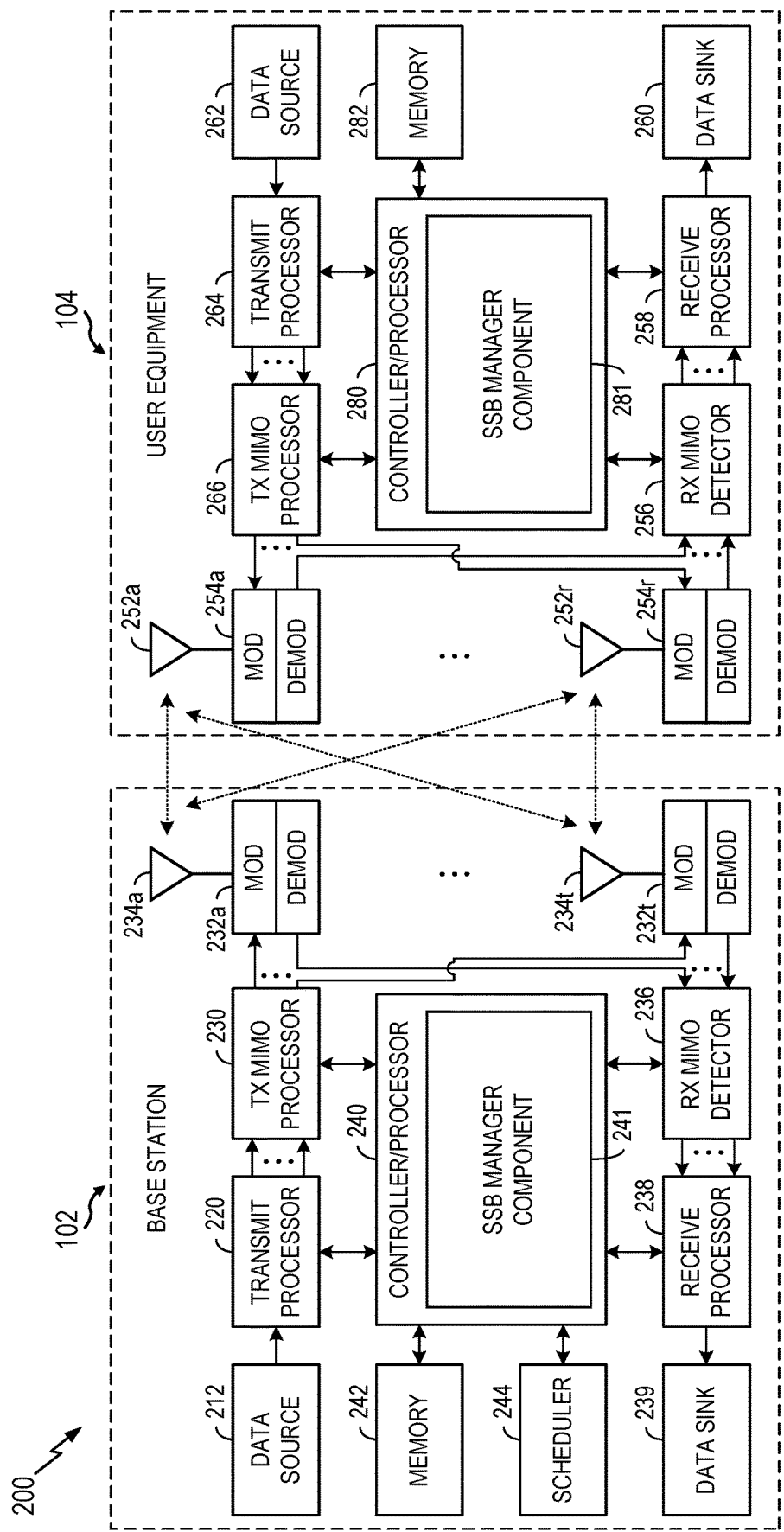
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes an SSB manager component 241, which may be representative of an SSB manager component 199 of FIG. 1. Notably, while depicted as an aspect of controller/processor 240, an SSB manager component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes an SSB manager component 281, which may be representative of an SSB manager component 198 of FIG. 1. Notably, while depicted as an aspect of controller/processor 280, an SSB manager component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Signal Synchronization Block Transmission

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SSS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as an SS burst set. SSBs in an SS burst set may be transmitted in the same frequency region, while SSBs in different SS bursts sets can be transmitted at different frequency regions.

Further system information, such as remaining minimum system information (RMSI), system information blocks (SIBs), and other system information (OSI) can be transmitted on a physical downlink shared channel (PDSCH) in certain subframes.

Figure 4:
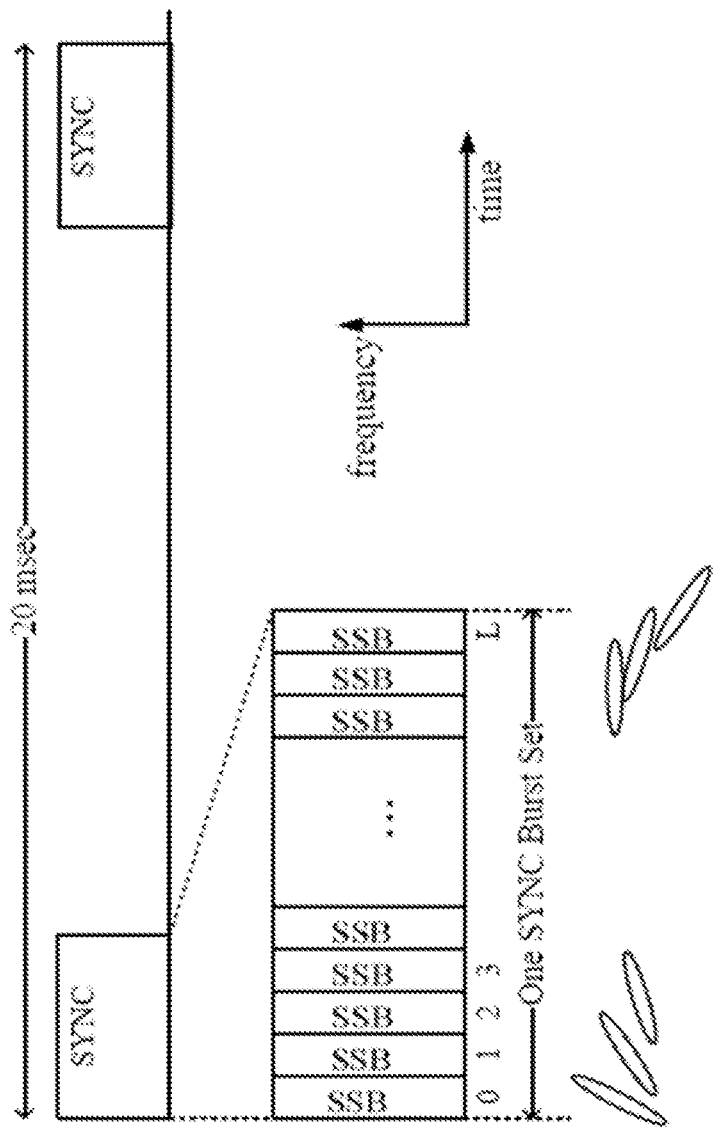
FIG. 4 illustrates how different synchronization signal blocks (SSBs) may be sent using different beams, according to aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (e.g., in certain mmW applications). A physical cell identity (PCI) may still be decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a master information block (MIB) conveying an index to a table that relates the time and frequency resources of the CORESET 504 to the time and frequency resources of the SS/PBCH block. The BS may also transmit control signaling. In some scenarios, the BS may also transmit a PDCCH within time/frequency resources of CORESET 504 (e.g., scheduling a PDSCH 506) to a UE.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 6B:
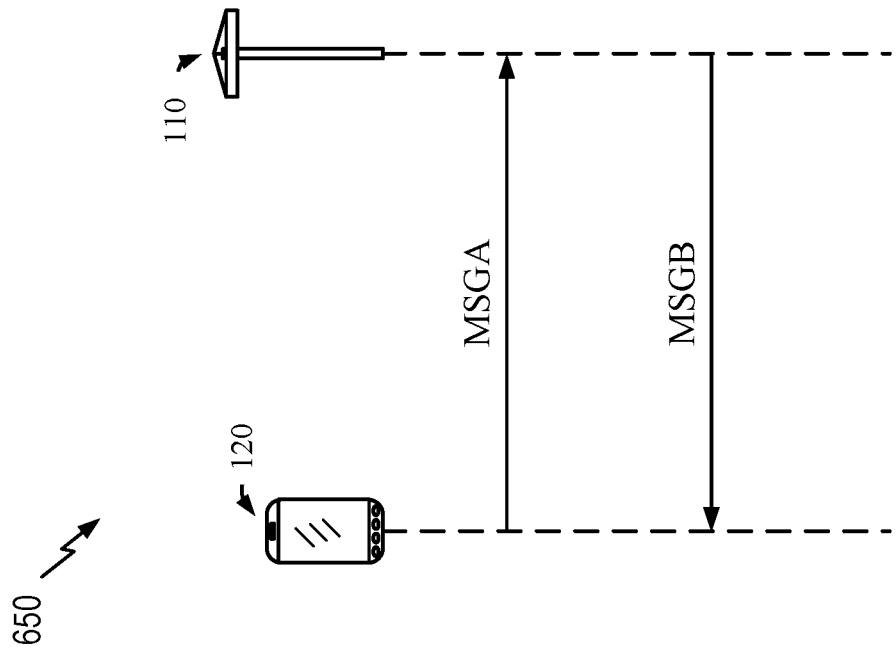
FIG. 6A and FIG. 6B are call-flow diagrams illustrating example four-step and two-step random access channel (RACH) procedures, in accordance with certain aspects of the present disclosure.
Figure 6A:
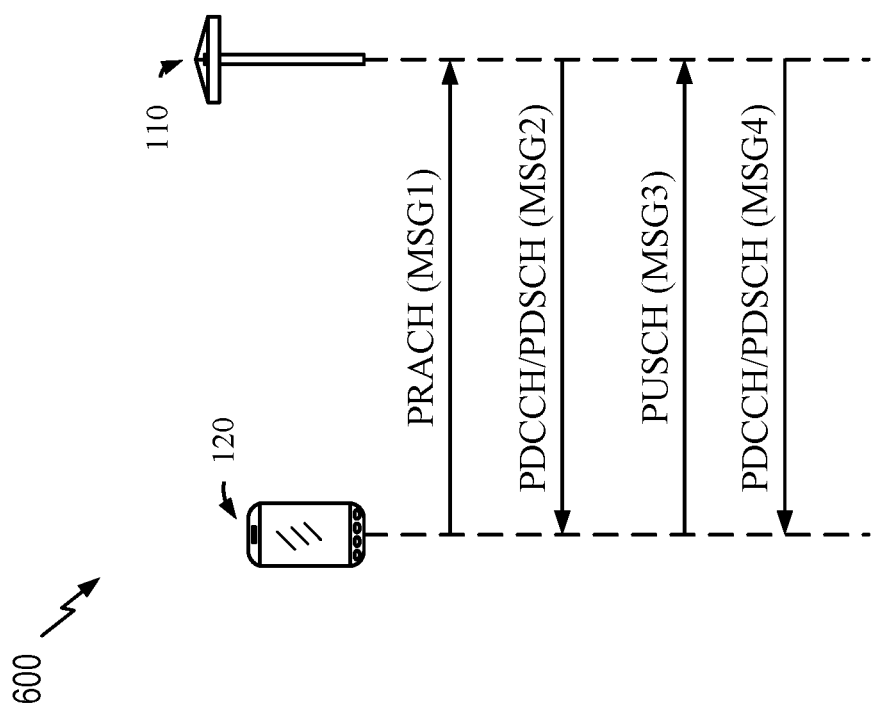

FIG. 6A is a timing (or "call-flow") diagram 600 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG4 which may include a contention resolution message.

In some cases, to speed access, a two-step RACH procedure may be supported. As the name implies, the two-step RACH procedure may effectively "collapse" the four messages of the four-step RACH procedure into two messages.

FIG. 6B is a timing diagram 650 illustrating an example two-step RACH procedure, in accordance with certain aspects of the present disclosure. A first enhanced message (msgA) may be sent from the UE 120 to BS 110. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or a scheduling request (SR). BS 110 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:

(1) selection of a preamble sequence; and
(2) selection of a preamble occasion in time/frequency domain (for transmitting the selected preamble sequence).

The msgA payload transmission generally involves:

(1) construction of the random access message payload (DMRS/PUSCH); and
(2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. As will be described in greater detail below, upon detecting an SSB, the UE may select an RO and one or more PRUs associated with that SSB for a msgA transmission. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that use two-step RACH procedures can typically support contention-based random access (CBRA) transmission of messages (e.g., msgA) within a finite range of payload sizes and with a finite number of MCS levels.

Overview of SSB to RACH Occasion Association

Figure 7:
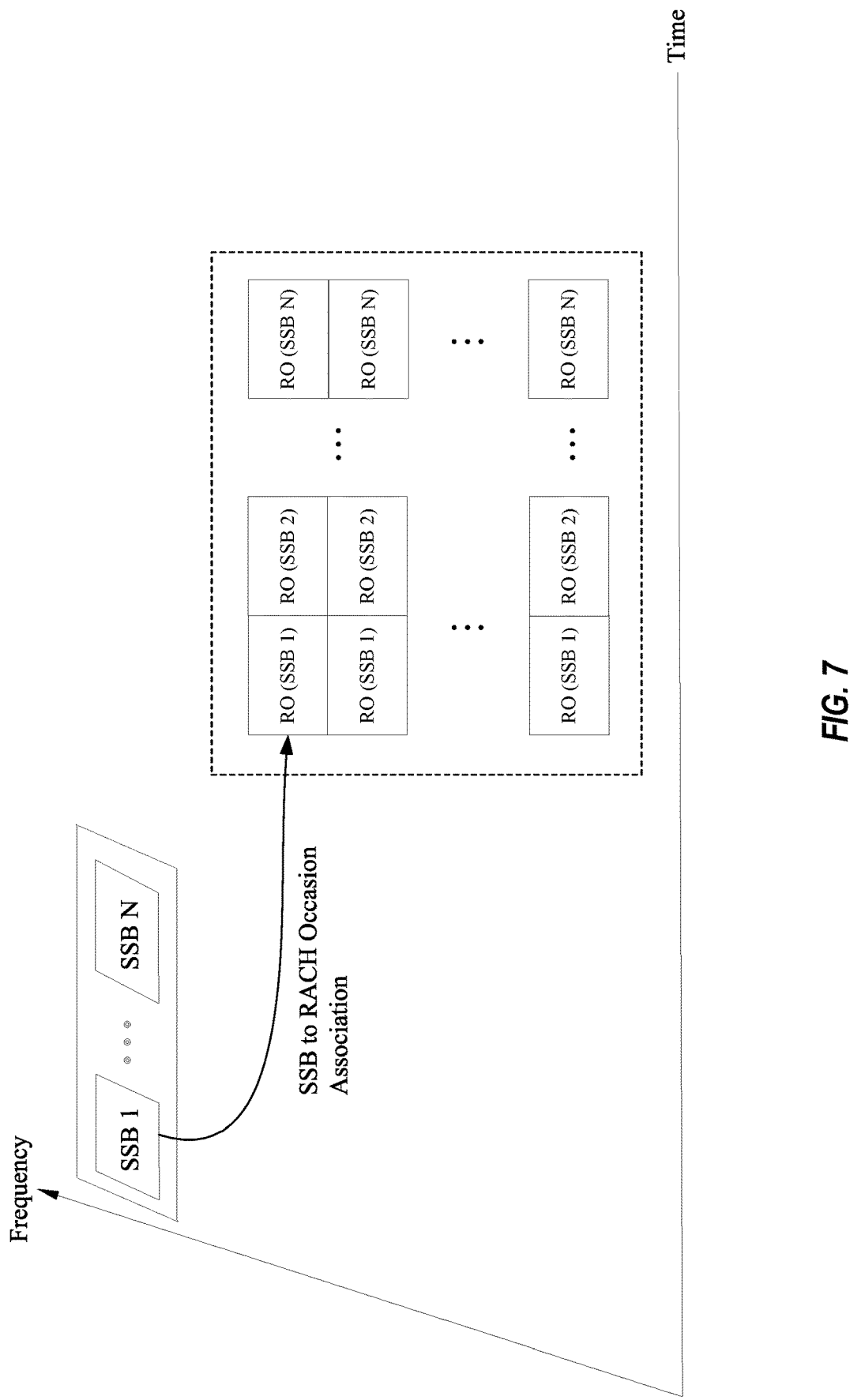
FIG. 7 illustrates an example association of SSBs to RACH occasions (ROs).

After a UE has selected an SSB (beam), for that SS block there is a predefined one or more RACH opportunities (ROs) with certain time and frequency offset and direction (e.g., specific to the selected SSB). FIG. 7 illustrates an example association (mapping) between SSBs and ROs.

This SSB to RO association is used for the gNB to know what beam the UE has acquired/is using (generally referred to as beam establishment). One SSB may be associated with one or more ROs or more than one SSB may be associated with one RO. Association is typically performed in the frequency domain first, then in the time domain within a RACH slot, then in the time domain across RACH slots (e.g., beginning with lower SSB indexes). An association period is typically defined as a minimum number of RACH configuration periods, such that all (configured) SSB beams are mapped into ROs.

Overview of Frequency Ranges

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Aspects Related to SSBs Patterns for Higher SCS

In some systems (e.g., according to NR), NR operation in a frequency regime between 52.6 GHz and 71 GHz (referred to as "FR2-2") may be deployed. In such systems, new SCSs may be used. For example, in addition to 120 kHz SCS, 480 kHz and 960 kHz SCSs may be used, along with newly defined maximum bandwidth(s), for operation in this frequency range for data and control channels and reference signals.

As noted above, increased SCS may result in various timing related challenges, for example, when supporting up to 64 SSB beams for licensed and unlicensed operation in this frequency range. In some cases, a UE may be expected to support 120 kHz SCS for SSB and 120 kHz SCS for initial access related signals/channels in an initial bandwidth part (BWP) and, perhaps, additional higher SCS (240 kHz, 480 kHz, 960 kHz) for SSB, and additional SCS (480 kHz, 960 kHz) for initial access related signals/channels in an initial BWP. In some cases, a UE may be expected to support additional SCS (480 kHz, 960 kHz) for SSB for cases other than initial access.

Figure 8:
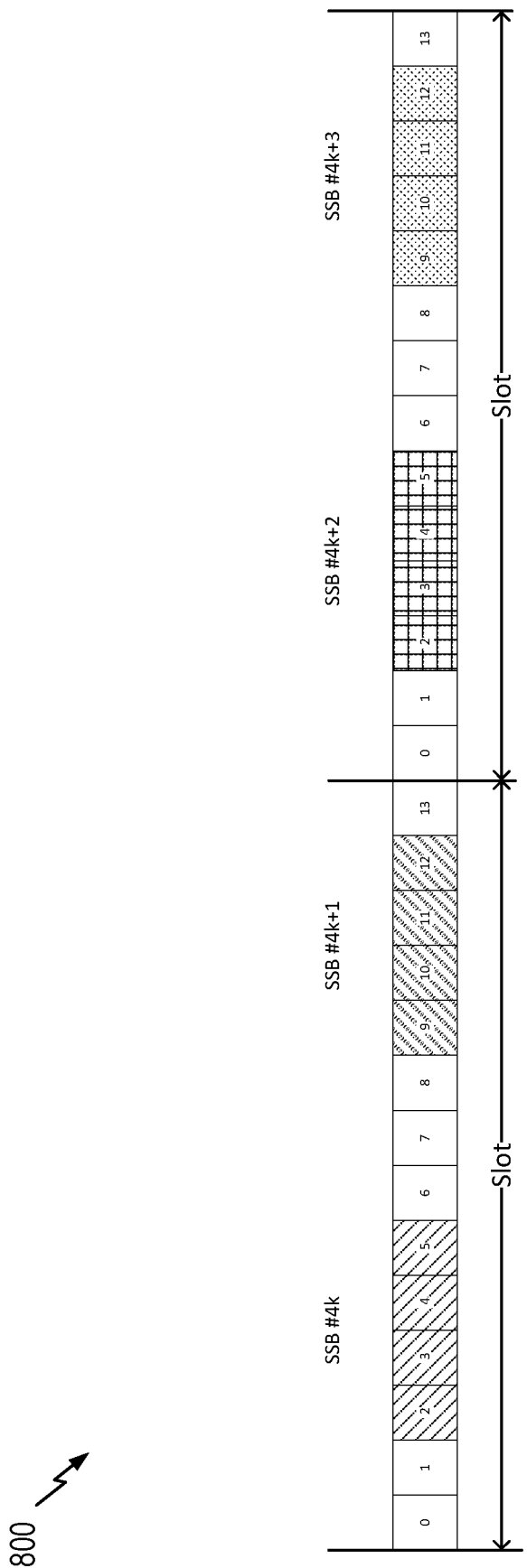
FIG. 8 is an example of SSBs within a slot for a given subcarrier spacing (SCS).

In some cases, there may be an established location, within a slot, for SSBs to occur. For example, FIG. 8 illustrates an SSB pattern 800 with location of SSBs that may be suitable for 480 kHz and 960 kHz SCSs. In the illustrated example, the first symbol of each SSB, within a given slot, is located at a symbol index 2 or 9. This may be generalized as the first symbol of each SSB having an index according to the following equation: index $\{2, 9\}+(14*n)$, assuming 14 symbols per slot. To provide some gaps between SSBs, the values of 'n' may exclude consecutive integer values (resulting in gap slots with no SSBs).

Due to the larger SCS and corresponding shorter symbols, the DL/UL switching delay may take more than a few symbols (e.g., 7.015 μs). To account for UL segments within an SSB burst (e.g., symbols 6, 7, and 8 of the slots in FIG. 8 could be used for UL segments), a few symbols need to be reserved for DL/UL switching delays.

If 2 SSBs are allocated in an SSB slot, as in the example shown in FIG. 8, 32 SSB slots are needed to sweep 64 beams. In case all SSB slots are back-to-back with no gap slots in between, the 32 slots would span 0.5 ms for a 960 kHz SCS. While this is much faster than the 5 ms for a 120 kHz SCS, the 0.5 ms may still be too long, for example, and may block traffic that requires low latency (e.g., ultra-reliable, low-latency communications (URLLC) traffic). Hence, SSB pattern designs may be considered that include gap slots within SSB slots of the burst.

In some cases (e.g., in Rel-15/16), for 120 kHz SCS, short gaps (4 or 8 symbols) and a long gap (36 symbols) may be inserted between the SSBs. For 240 kHz, the same gaps in time may be used (i.e., 2× the number of symbols for 120 kHz), which corresponds to ~35.7 or 71.4 μs for the short gaps and ~321.4 μs for the long gap. The SSB pattern may be designed so the long gap occurs every 2.25 ms.

Figure 9:
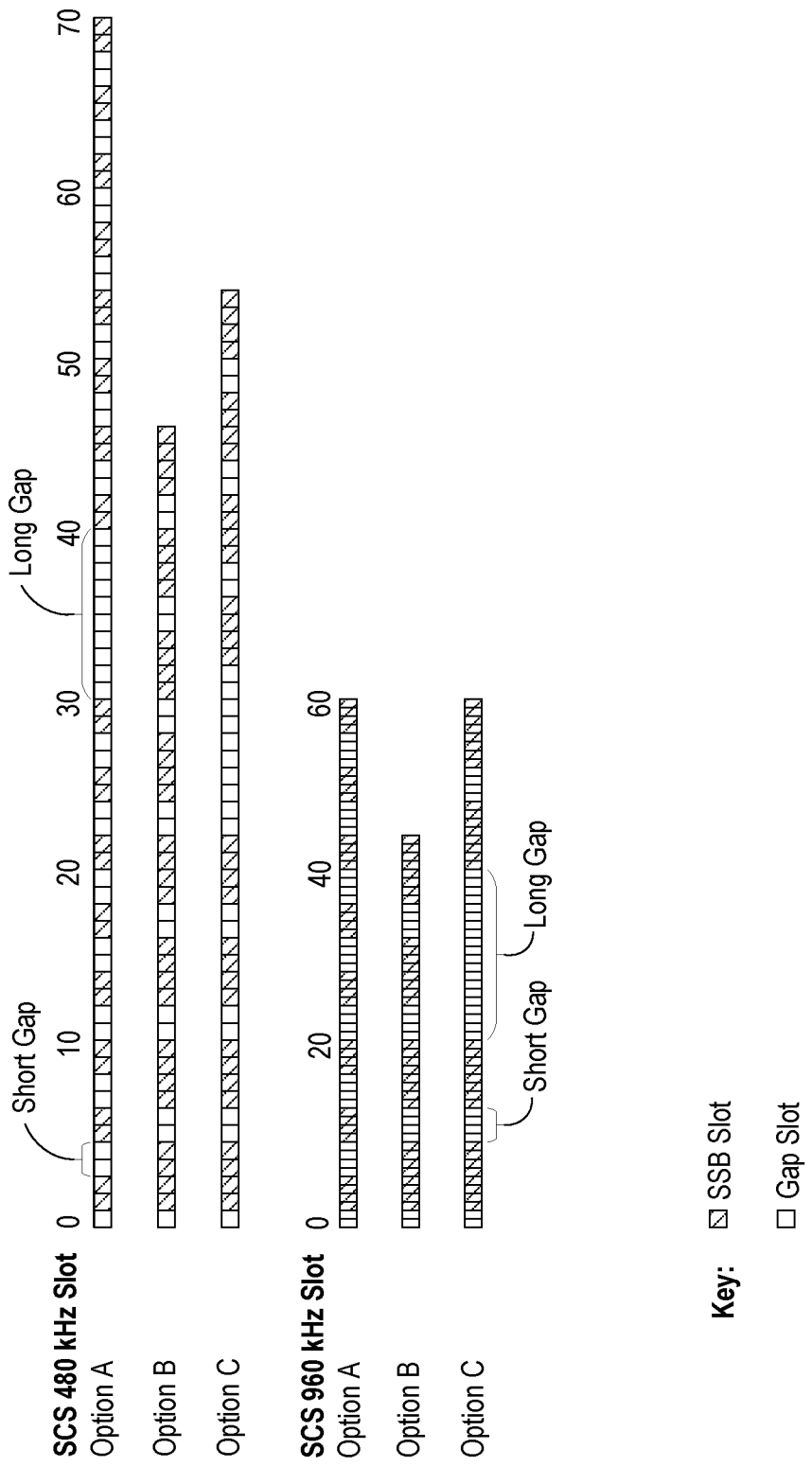
FIG. 9 illustrates example SSB patterns for different SCSs, in accordance with certain aspects of the present disclosure.

Aspects of the present disclosure provide SSB patterns with gaps designed to accommodate higher SCS. For example, FIG. 9 illustrates examples of various options for SSB patterns proposed herein may be suitable for 480 kHz and 960 kHz SCS deployments. As illustrated, the various patterns include slots containing SSBs (labeled SSB slots) and slots that do not contain SSBs (labeled gap slots). Each SSB slot may, for example, include two SSBs (e.g., sent with different beams), as shown in FIG. 8.

According to a first option, referred to (and labeled in FIG. 9) as Option A, a gap pattern may be designed to maintain (e.g., as much as possible) the same gap pattern (and location) as for a gap pattern used for a lower SCS (e.g., 120/240 kHz SCS). For this option, however, the SSB sweep time may be similar to that of the lower SCS (e.g., 240 kHz) and, thus, for 480 kHz there may be some challenges with respect to handling a short control signaling exemption (e.g., sending ACK/NACK signals without sensing the frequency for the presence of other signals).

For Option A, 62.5 μs short gaps (e.g., equivalent to the Rel-15/16 short gaps described above) may be added. As another example, a long gap (e.g., 312.5 μs) may be introduced in the middle of the SSB sweep for 480 kHz.

For Option A, example SSB slot locations, for a 480 kHz SCS example, may be determined as follows:

SSB slots($n$)=$\{1,2\}+4*m$, where m=0, 1, . . . , 7, 10, 11, . . . , 17. In this case, sweep time may be as follows:

sweep time=70 slots=~2.2 ms.

Example SSB slot locations, for a 960 kHz SCS example, may be determined as follows:

SSB slots($n$)=$\{2,3,4,5\}+8*m$, where m=0, 1, . . . , 7. In this case, the sweep time may be as follows:

sweep time=60 slots=~0.93 ms.

According to a second option, referred to (and labeled in FIG. 9) as Option B, a pattern may be designed that maintains short gaps, but with less periodicity when compared with Option A. For this option, the SSB sweep time may comply with short control signaling exemption. For example, an SSB pattern according to this option may add 62.5 μs gaps.

For Option B, example SSB slot locations for a 480 kHz SCS example, may be determined as follows:

SSB slots($n$)=$\{1,2,3,4\}+6*m$, where m=0, 1, . . . , 7. In this case, the sweep time may be as follows:

sweep time=46 slots=~1.44 ms.

For Option B, example SSB slot locations for a 960 kHz SCS, SSB slot locations may be determined as follows:

SSB slots($n$)=$\{2,3,4,5,6,7,8,9\}+12*m$, where m=0, 1, . . . , 7. In this case, the sweep time may be as follows:

sweep time=44 slots=~0.69 ms.

According to a third option, referred to (and labeled in FIG. 9) as Option C, an SSB pattern may be designed that maintains short gaps with less periodicity (e.g., than Option A) and also uses a long gap. For this option, the SSB sweep time may comply with short control signaling exemption. For example, this option may add 62.5 μs gaps, and a long gap (e.g., 312.5 μs) may also be introduced in the middle of the SSB sweep.

For Option C, example SSB slot locations for a 480 kHz SCS may be determined as follows:

SSB slots($n$)=$\{n1,n2\}$;

where $\{n1\}=\{1,2,3,4\}+6*m$, where $m=0,1,2,3$; and $\{n2\}=\{33,34,35,36\}+6*m$; where $m=0,1,2,3$.

For this example, sweep time may be as follows:

sweep time=46 slots=1.65 ms.

For Option C, example SSB slot locations for a 960 kHz SCS may be determined as follows:

SSB slots($n$)=$\{n1,n2\}$, where $\{n1\}=\{2,9\}+12*m$, where $m=0,1,2,3$; and $\{n2\}=\{42, \ldots ,49\}+12*m$; where $m=0,1,2,3$.

For this example, sweep time may be as follows:

sweep time=60 slots=~0.93 ms.

In some cases, the SSB pattern may be configurable by the network. In such cases, the gNB may configure the UE with an SSB pattern (e.g., according to one of the options described above). A configurable SSB pattern may have various advantages and provide some degree of flexibility to accommodate different use cases for the SSBs (e.g., by reducing or increasing gap slots).

For example, in the case of non-initial access, there may be cases where the gNB may need to have very fast beam sweeping and reduce the need for gaps. As another example, the gNB may require more gaps for more flexibility of UL or URLLC traffic.

Thus, a gNB may configure certain SSB patterns for non-initial access cases, including configuration for short and long gap slots and the number of consecutive SSB slots. Depending on the flexibility needed, there may be different levels of gap pattern configurations. For example, the different levels may differ in terms of length (e.g., in slots) of the short gaps and length (e.g., in slots) of the long gap. Further, different levels of gap patterns may differ in where the various gaps are located within an SSB burst and/or how many back-to-back SSB slots are in a pattern (e.g., 4 for 960 kHz option A and 8 for option B as shown in FIG. 9).

Example Methods

FIG. 10 illustrates example operations 1000 for wireless communications by a network entity, in accordance with some aspects of the present disclosure.

At 1010, a wireless network entity may transmit signaling indicating a synchronization signal block (SSB) pattern that identifies SSB slots for sweeping a set of SSB beams over one or more SSB bursts with configurable gaps between at least some of the SSB slots. For example, the base station (BS) 102/180 shown in FIGS. 1-2 may transmit signaling indicating an SSB pattern (e.g., Options A, B, and C in FIG. 9) that identifies SSB slots for sweeping a set of SSB beams (e.g., the SSB beams of FIG. 4) over one or more SSB bursts (e.g., the SSB burst of FIG. 4) with configurable gaps between at least some of the SSB slots.

At 1020, the wireless network entity may transmit SSBs in accordance with the pattern. For example, BS 102/180 may transmit SSBs (e.g., SSBs 0-L of FIG. 4) in accordance with the indicated pattern.

FIG. 11 illustrates example operations for wireless communications by a user equipment (UE), in accordance with some aspects of the present disclosure. For example, UE 104 may perform the example operations 1100.

At 1110, a UE may receive signaling indicating an SSB pattern that identifies SSB slots for sweeping a set of SSB beams over one or more SSB bursts with configurable gaps between at least some of the SSB slots. For example, UE 104 (shown in FIGS. 1-2) may receive signaling indicating an SSB pattern (e.g., Options A, B, and C in FIG. 9) that identifies SSB slots for sweeping a set of SSB beams (e.g., the SSB beams of FIG. 4) over one or more SSB bursts (e.g., the SSB burst of FIG. 4) with configurable gaps between at least some of the SSB slots.

At 1120, the UE may monitor for SSBs in accordance with the pattern. For example, UE 104 may monitor for SSBs (e.g., SSBs 0-L of FIG. 4) in accordance with the indicated pattern.

Example Wireless Communication Devices

Figure 12:
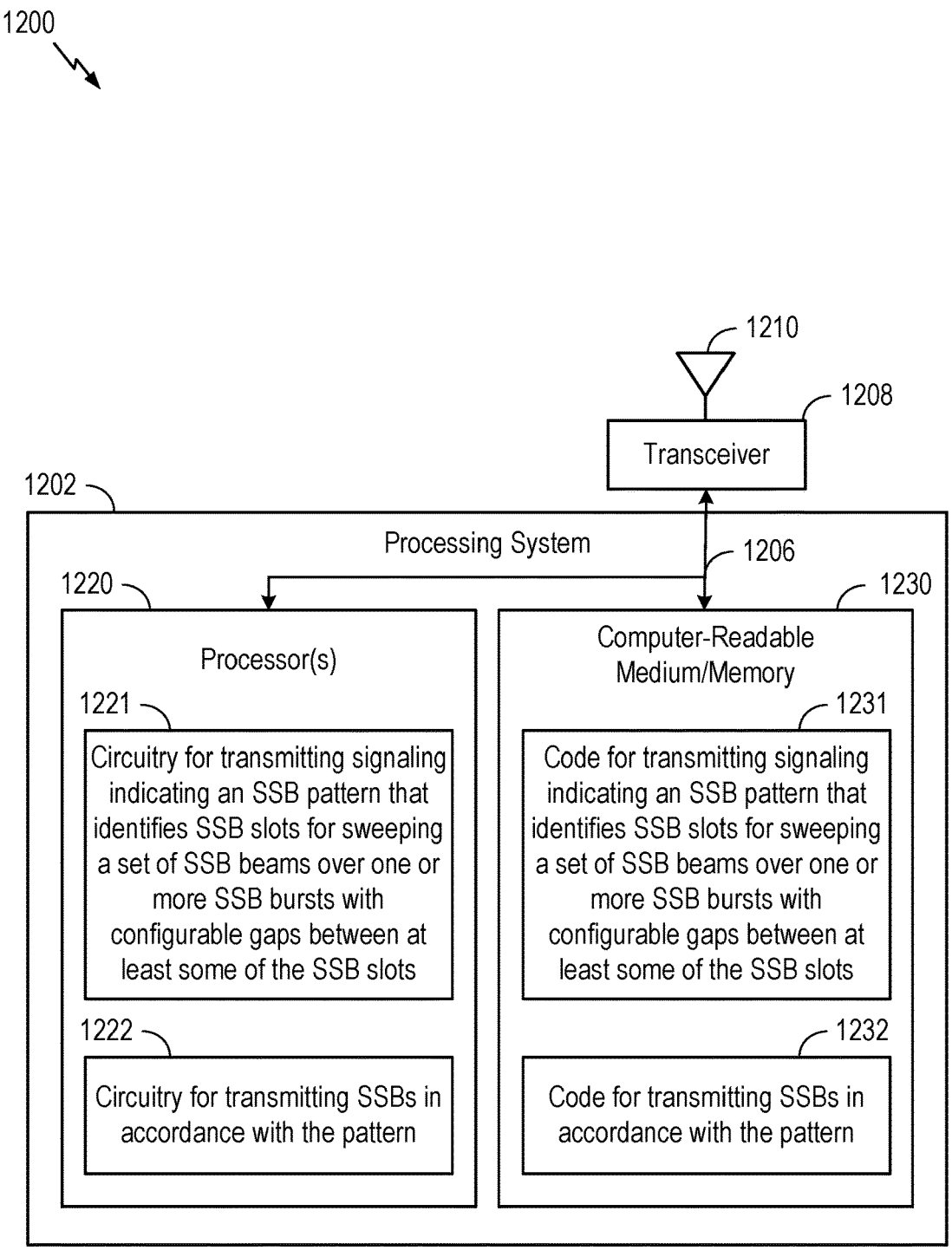
FIG. 12 depicts aspects of an example communications device.

FIG. 12 depicts an example communications device 1200 that includes various components operable, configured, or adapted to perform operations for the techniques disclosed herein, such as the operations depicted and described with respect to FIG. 10 and FIG. 11. In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 10, or other operations for performing the various techniques discussed herein for transmitting SSBs with patterns for SCS.

In the depicted example, computer-readable medium/memory 1230 stores code 1231 for transmitting signaling indicating an SSB pattern that identifies SSB slots for sweeping a set of SSB beams over one or more SSB bursts with configurable gaps between at least some of the SSB slots, and code 1232 for transmitting SSBs in accordance with the pattern.

In the depicted example, the one or more processors 1220 include circuitry configured to implement the code stored in the computer-readable medium/memory 1230, including circuitry 1221 for transmitting signaling indicating an SSB pattern that identifies SSB slots for sweeping a set of SSB beams over one or more SSB bursts with configurable gaps between at least some of the SSB slots, and circuitry 1222 for transmitting SSBs in accordance with the pattern.

Various components of communications device 1200 may provide means for performing the methods described herein, including with respect to FIG. 10.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communication device 1200 in FIG. 12.

In some examples, means for transmitting may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including an SSB manager component 241).

Notably, FIG. 12 is an example, and many other examples and configurations of communication device 1200 are possible.

Figure 13:
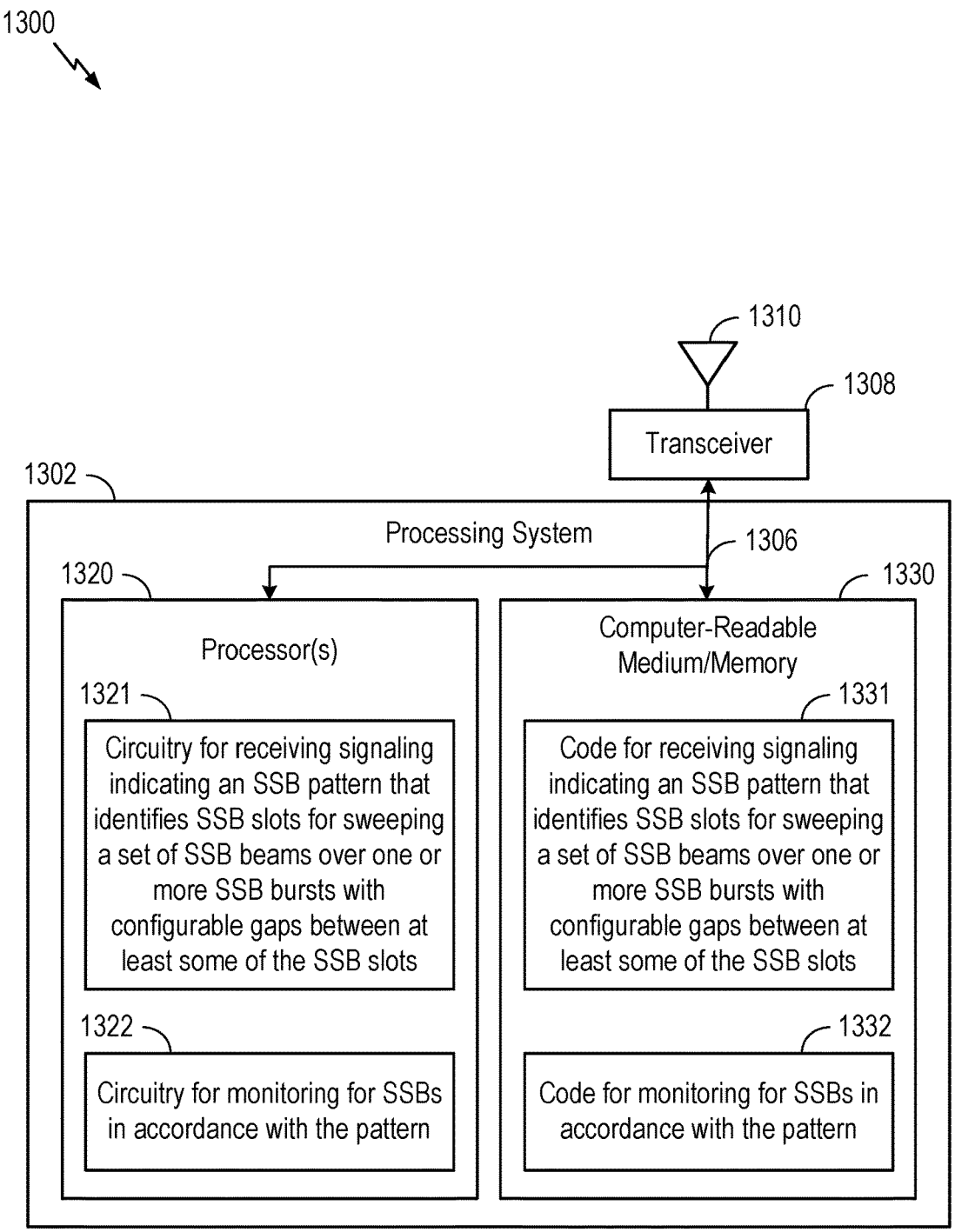
FIG. 13 depicts aspects of an example communications device.

FIG. 13 depicts an example communications device 1300 that includes various components operable, configured, or adapted to perform operations for the techniques disclosed herein, such as the operations depicted and described with respect to FIG. 11. In some examples, communication device 1300 may be a user equipment 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 11, or other operations for performing the various techniques discussed herein for receiving SSBs with patterns for SCS.

In the depicted example, computer-readable medium/memory 1330 stores code 1331 for receiving signaling indicating an SSB pattern that identifies SSB slots for sweeping a set of SSB beams over one or more SSB bursts with configurable gaps between at least some of the SSB slots, and code 1332 for monitoring for SSBs in accordance with the pattern.

In the depicted example, the one or more processors 1320 include circuitry configured to implement the code stored in the computer-readable medium/memory 1330, including circuitry 1321 for receiving signaling indicating an SSB pattern that identifies SSB slots for sweeping a set of SSB beams over one or more SSB bursts with configurable gaps between at least some of the SSB slots, and circuitry 1322 for monitoring for SSBs in accordance with the pattern.

Various components of communications device 1300 may provide means for performing the methods described herein, including with respect to FIG. 11.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the user equipment 104 illustrated in FIG. 2 and/or transceiver 1308 and antenna 1310 of the communication device 1300 in FIG. 13.

In some examples, means for monitoring may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including an SSB manager component 281).

Notably, FIG. 13 is an example, and many other examples and configurations of communication device 1300 are possible.

Example Clauses

Clause 1: A method for wireless communication for a network entity, comprising transmitting signaling indicating a synchronization signal block (SSB) pattern that identifies SSB slots for sweeping a set of SSB beams over one or more SSB bursts with configurable gaps between at least some of the SSB slots, and transmitting SSBs in accordance with the pattern.

Clause 2: The method of clause 1, wherein at least one of a location or length of the configurable gaps depends on a use case of the SSBs.

Clause 3: The method of clause 2, wherein at least one of the location or length of the configurable gaps depends on whether the SSBs are for initial access or another use case.

Clause 4: The method of any one of clauses 1 through 3, wherein the signaling indicates a length of the configurable gaps in slots.

Clause 5: The method of any one of clauses 1 through 4, wherein the signaling configures the gaps according to one of a plurality of gap patterns.

Clause 6: The method of clause 5, wherein a first gap pattern of the plurality of gap patterns comprises a plurality of gaps of a first length within an SSB burst, and at least one gap of a second length, longer than the first length, within the SSB burst.

Clause 7: The method of clause 6, wherein a second gap pattern of the plurality of gap patterns comprises a plurality of gaps of the first length that occur less frequently than in the first gap pattern.

Clause 8: The method of clause 7, wherein a third gap pattern of the plurality of gap patterns comprises a plurality of gaps of the first length that occur less frequently than in the first gap pattern, and at least one gap of a length, longer than the first length, that occurs within the SSB burst.

Clause 9: The method of any one of clauses 6 through 8, wherein the first and second length depend, at least in part, on a subcarrier spacing (SCS).

Clause 10: The method of clause 9, wherein at least one of the first or second length for a first SCS is based on the first or second length for a second SCS.

Clause 11: A method for wireless communication for a user equipment, comprising receiving signaling indicating a synchronization signal block (SSB) pattern that identifies SSB slots for sweeping a set of SSB beams over one or more SSB bursts with configurable gaps between at least some of the SSB slots, and monitoring for SSBs in accordance with the pattern.

Clause 12: The method of clause 11, wherein at least one of a location or length of the configurable gaps depends on a use case of the SSBs.

Clause 13: The method of clause 12, wherein at least one of the location or length of the configurable gaps depends on whether the SSBs are for initial access or another use case.

Clause 14: The method of any one of clauses 11 through 13, wherein the signaling indicates a length of the configurable gaps in slots.

Clause 15: The method of any one of clauses 11 through 14, wherein the signaling configures the gaps according to one of a plurality of gap patterns.

Clause 16: The method of clause 15, wherein a first gap pattern of the plurality of gap patterns comprises a plurality of gaps of a first length within an SSB burst, and at least one gap of a second length, longer than the first length, within the SSB burst.

Clause 17: The method of clause 16, wherein a second gap pattern of the plurality of gap patterns comprises a plurality of gaps of the first length that occur less frequently than in the first gap pattern.

Clause 18: The method of clause 17, wherein a third gap pattern of the plurality of gap patterns comprises a plurality of gaps of the first length that occur less frequently than in the first gap pattern, and at least one gap of a length, longer than the first length, that occurs within the SSB burst.

Clause 19: The method of any one of clauses 16 through 18, wherein the first and second length depend, at least in part, on a subcarrier spacing (SCS).

Clause 20: The method of clause 19, wherein at least one of the first or second length for a first SCS is based on the first or second length for a second SCS.

Clause 21: An apparatus, comprising: a memory comprising executable instructions; and one or more processors configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by one or more processors of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols. MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration. For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of transmitting synchronization signal blocks (SSBs) in patterns for high frequency subcarrier spacing (SCS) in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity configured for wireless communications, comprising:
    memory comprising computer-executable instructions; and
    one or more processors configured to execute the computer-executable instructions and cause the network entity to:
        transmit signaling indicating a synchronization signal block (SSB) pattern that identifies SSB slots for sweeping a set of SSB beams over one or more SSB bursts with configurable gaps between at least some of the SSB slots, wherein each of the configurable gaps comprises one or more gap slots, and wherein a quantity of the one or more gap slots is determined based on a subcarrier spacing (SCS) associated with SSBs; and
        transmit the SSBs in accordance with the pattern.

2. The network entity of claim 1, wherein at least one of a location or length of the configurable gaps depends on a use case of the SSBs.

3. The network entity of claim 2, wherein at least one of the location or length of the configurable gaps depends on whether the SSBs are for initial access or another use case.

4. The network entity of claim 1, wherein the signaling indicates a length of the configurable gaps in terms of number of slots.

5. The network entity of claim 1, wherein the signaling configures the gaps according to one of a plurality of gap patterns.

6. The network entity of claim 5, wherein a first gap pattern of the plurality of gap patterns comprises:
    a plurality of gaps of a first length within an SSB burst; and
    at least one gap of a second length, longer than the first length, within the SSB burst.

7. The network entity of claim 6, wherein a second gap pattern of the plurality of gap patterns comprises:
    a plurality of gaps of the first length that occur less frequently than in the first gap pattern.

8. The network entity of claim 7, wherein a third gap pattern of the plurality of gap patterns comprises:
    a plurality of gaps of the first length that occur less frequently than in the first gap pattern; and
    at least one gap of a length, longer than the first length, that occurs within the SSB burst.

9. The network entity of claim 6, wherein the first and second length depend, at least in part, on the SCS.

10. The network entity of claim 9, wherein at least one of the first or second length for a first SCS is based on the first or second length for a second SCS.

11. The network entity of claim 1, wherein the one or more gap slots comprises one or more slots without SSBs.

12. A user equipment (UE) configured for wireless communications, comprising:
    memory comprising computer-executable instructions; and
    one or more processors configured to execute the computer-executable instructions and cause the UE to:
        receive signaling indicating a synchronization signal block (SSB) pattern that identifies SSB slots for sweeping a set of SSB beams over one or more SSB bursts with configurable gaps between at least some of the SSB slots, wherein each of the configurable gaps comprises one or more gap slots, and wherein a quantity of the one or more gap slots is determined based on a subcarrier spacing (SCS) associated with SSBs; and monitor for SSBs in accordance with the pattern.

13. The UE of claim 12, wherein at least one of a location or length of the configurable gaps depends on a use case of the SSBs.

14. The UE of claim 13, wherein at least one of the location or length of the configurable gaps depends on whether the SSBs are for initial access or another use case.

15. The UE of claim 12, wherein the signaling indicates a length of the configurable gaps in slots.

16. The UE of claim 12, wherein the signaling configures the gaps according to one of a plurality of gap patterns.

17. The UE of claim 16, wherein a first gap pattern of the plurality of gap patterns comprises:
a plurality of gaps of a first length within an SSB burst; and
at least one gap of a second length, longer than the first length, within the SSB burst.

18. The UE of claim 17, wherein a second gap pattern of the plurality of gap patterns comprises:
a plurality of gaps of the first length that occur less frequently than in the first gap pattern.

19. The UE of claim 18, wherein a third gap pattern of the plurality of gap patterns comprises:
a plurality of gaps of the first length that occur less frequently than in the first gap pattern; and
at least one gap of a length, longer than the first length, that occurs within the SSB burst.

20. The UE of claim 17, wherein the first and second length depend, at least in part, on the SCS.

21. The UE of claim 20, wherein at least one of the first or second length for a first SCS is based on the first or second length for a second SCS.

22. A method for wireless communication for a network entity, comprising:
transmitting signaling indicating a synchronization signal block (SSB) pattern that identifies SSB slots for sweeping a set of SSB beams over one or more SSB bursts with configurable gaps between at least some of the SSB slots, wherein each of the configurable gaps comprises one or more gap slots, and wherein a quantity of the one or more gap slots is determined based on a subcarrier spacing (SCS) associated with SSBs; and
transmitting SSBs in accordance with the pattern.

23. A method for wireless communication for a user equipment, comprising:
receiving signaling indicating a synchronization signal block (SSB) pattern that identifies SSB slots for sweeping a set of SSB beams over one or more SSB bursts with configurable gaps between at least some of the SSB slots, wherein each of the configurable gaps comprises one or more gap slots, and wherein the SSB pattern in terms of the SSB slots and the one or more gap slots is determined based on a subcarrier spacing (SCS) associated with SSBs; and
monitoring for SSBs in accordance with the pattern.

24. The method of claim 23, wherein at least one of a location or length of the configurable gaps depends on a use case of the SSBs.

25. The method of claim 24, wherein at least one of the location or length of the configurable gaps depends on whether the SSBs are for initial access or another use case.

26. The method of claim 23, wherein the signaling indicates a length of the configurable gaps in terms of a number of slots.

27. The method of claim 23, wherein the signaling configures the gaps according to one of a plurality of gap patterns.

28. The method of claim 27, wherein a first gap pattern of the plurality of gap patterns comprises:
a plurality of gaps of a first length within an SSB burst; and
at least one gap of a second length, longer than the first length, within the SSB burst.

29. The method of claim 28, wherein a second gap pattern of the plurality of gap patterns comprises:
a plurality of gaps of the first length that occur less frequently than in the first gap pattern.

30. The method of claim 29, wherein a third gap pattern of the plurality of gap patterns comprises:
a plurality of gaps of the first length that occur less frequently than in the first gap pattern; and
at least one gap of a length, longer than the first length, that occurs within the SSB burst.

* * * * *